United States Patent
Devanand et al.

(10) Patent No.: US 9,835,235 B2
(45) Date of Patent: Dec. 5, 2017

(54) LEAD SCREW OPERATED RACK-IN MECHANISM

(71) Applicants: Gole Devanand, Maharashtra (IN); Shah Sachin, Maharashtra (IN)

(72) Inventors: Gole Devanand, Maharashtra (IN); Shah Sachin, Maharashtra (IN)

(73) Assignee: ASCO POWER TECHNOLOGIES, L.P., Florham Park, NJ (US)

(*) Notice: Subject to any disclaimer, the term of this patent is extended or adjusted under 35 U.S.C. 154(b) by 257 days.

(21) Appl. No.: 13/959,509

(22) Filed: Aug. 5, 2013

(65) Prior Publication Data

US 2014/0260731 A1    Sep. 18, 2014

(30) Foreign Application Priority Data

Mar. 13, 2013    (IN) ........................... 752/MUM/2013

(51) Int. Cl.
  *F16H 25/20*        (2006.01)
  *H02B 11/127*       (2006.01)

(52) U.S. Cl.
  CPC ............ *F16H 25/20* (2013.01); *H02B 11/127* (2013.01); *F16H 2025/2043* (2013.01); *Y10T 74/18576* (2015.01)

(58) Field of Classification Search
  CPC ............. F16H 25/20; F16H 2025/2043; H02B 11/127; Y10T 74/18576
  USPC ......................................... 74/89.23; 324/415
  See application file for complete search history.

(56) References Cited

U.S. PATENT DOCUMENTS

| | | | | |
|---|---|---|---|---|
| 4,743,715 A * | 5/1988 | Gerbert-Gaillard | . | H02B 11/133 200/50.23 |
| 5,317,769 A * | 6/1994 | Weismiller | ............ | A61G 7/005 5/610 |
| 5,397,868 A * | 3/1995 | Smith | ..................... | H01H 3/34 200/18 |
| 5,459,293 A * | 10/1995 | Hodkin | ................ | H02B 11/127 200/50.26 |
| 6,028,272 A * | 2/2000 | Akers | .................. | H02B 11/133 200/50.21 |
| 6,160,229 A * | 12/2000 | Grelier | .................. | H02B 11/10 200/50.26 |
| 6,184,483 B1 * | 2/2001 | Coudert | ................... | H01H 3/30 200/323 |
| 6,651,775 B2 * | 11/2003 | Bassett, Jr. | ........... | B66F 11/042 182/69.5 |

(Continued)

*Primary Examiner* — Robert J Hoffberg
*Assistant Examiner* — Matt Dhillon
(74) *Attorney, Agent, or Firm* — McDonnell Boehnen Hulbert & Berghoff LLP

(57) ABSTRACT

A lead screw operated drawout mechanism for an electrical system is disclosed. The lead screw operated drawout mechanism includes a lead screw, a nut, a drive shaft and a connecting mechanism. The lead screw is supported on a support frame in a way such that the lead screw rotates with respect to the support frame. The nut is disposed on the lead screw, wherein rotary motion of the lead screw facilitates linear motion of the nut on the lead screw. The drive shaft is rigidly disposed on the nut and configures linear motion along with the nut. The connecting mechanism is functionally connected to the drive shaft and the electrical system for facilitating activation and de-activation of the electrical system.

23 Claims, 7 Drawing Sheets

(56) References Cited

U.S. PATENT DOCUMENTS

| | | | | |
|---|---|---|---|---|
| 6,884,949 B2* | 4/2005 | Yoon | H02B 11/133 | 200/50.26 |
| 7,019,229 B1* | 3/2006 | Weister | H01H 9/22 | 200/50.01 |
| 7,544,908 B2* | 6/2009 | Webb | H02B 11/127 | 200/50.24 |
| 7,667,154 B2* | 2/2010 | Dolinski | H01H 3/30 | 200/400 |
| 7,774,876 B2* | 8/2010 | Brown | A61G 7/005 | 5/610 |
| 7,821,775 B2* | 10/2010 | Narayanasamy | H02B 11/127 | 200/50.21 |
| 7,847,203 B2* | 12/2010 | Narayanan | H02B 11/12 | 200/400 |
| 7,896,134 B2* | 3/2011 | Morris | A61G 3/063 | 187/200 |
| 7,963,181 B2* | 6/2011 | Zeng | F16C 29/02 | 297/362.11 |
| 7,964,809 B2* | 6/2011 | Sapuram | H02B 11/133 | 200/50.21 |
| 8,198,557 B2* | 6/2012 | Lee | H02B 11/133 | 200/50.21 |
| 8,247,716 B2* | 8/2012 | Weister | H02B 11/10 | 200/50.24 |
| 8,304,672 B2* | 11/2012 | Lee | H02B 11/127 | 200/50.25 |
| 8,342,055 B2* | 1/2013 | Wang | H01L 21/68 | 108/143 |
| 8,395,064 B2* | 3/2013 | Kim | H02B 11/133 | 200/50.21 |
| 8,525,054 B2* | 9/2013 | Pai | H01H 71/126 | 200/50.21 |
| 8,809,705 B2* | 8/2014 | Serrano | | 200/50.21 |
| 9,009,893 B2* | 4/2015 | Kramer | A61G 7/005 | 340/573.1 |
| 2011/0252904 A1* | 10/2011 | Sun | B23Q 1/25 | 74/89.23 |
| 2011/0253832 A1* | 10/2011 | Wildman | B64C 9/02 | 244/99.13 |
| 2013/0319147 A1* | 12/2013 | Yamada | F16H 25/2006 | 74/89.23 |
| 2014/0226262 A1* | 8/2014 | Salugu | H02B 11/127 | 361/679.01 |
| 2014/0260731 A1* | 9/2014 | Devanand | F16H 25/20 | 74/89.23 |

* cited by examiner

LEAD SCREW OPERATED RACK-IN MECHANISM

FIELD OF THE DISCLOSURE

The present disclosure generally relates to electrical systems.

Particularly, the present disclosure relates to a drawout mechanism for electrical Isolation systems.

DEFINITIONS

Nut: Nut is a structure/mechanism that configures linear motion on a lead screw, wherein the linear motion of the nut is caused by rotary motion of the lead screw. Also, the nut is adapted to rigidly hold a drive shaft thereon

BACKGROUND

A transfer switch is an electrical switch that switches a load between two sources. A transfer switch may be manually activated or automatic in operation. An Automatic transfer switch (ATS) functions by sensing status of power sources. An Automatic Transfer Switch (ATS) is generally installed where a backup power supply is present, so that the backup power supply may provide temporary electrical power if the utility power source fails. An ATS is used to provide continuous supply of power to various devices, such as a motor, an electrical load and associated circuitry and the like. An ATS mainly consists of electrical contacts that can carry incoming utility and alternate isolation source. Outgoing connections from an ATS is connected to end application through 'Bus'.

Normally, an ATS is connected to a utility isolation source. Whenever there is a fault in a utility power supply, the ATS transfers the power connection from a utility isolation source to an alternate Isolation source. As and when the fault is rectified an ATS again transfers power connection to a utility Isolation source.

An ATS needs to be maintained periodically or repaired whenever fault occurs. If an ATS is mounted stationary to structural members or a frame of a Panel, inspection and maintenance of the ATS becomes difficult and quite hazardous if attempted while the Panel is live. To reduce the hazards of working with live Panels, an ATS needs a drawout mechanism, which primarily isolate the unit from the live buses & drawn out of the Panel for any sort of maintenance. Thus, an ATS need to be plugged in and unplugged from a live Panel in a relatively safe manner by means of a drawout mechanism. A drawout mechanism connects an ATS to a Bus.

Accordingly, there exists drawout mechanisms in the prior art that facilitate plugging and unplugging of an ATS from a live Panel. However, the prior art drawout mechanisms have numerous limitations. For example, the prior art drawout mechanisms include various components such as, a complicated gear box, a shaft coupling and stoppers which are adding more cost and are less efficient. Further, the prior art drawout mechanisms do not absorb vertical misalignment.

Accordingly, there is need of a drawout mechanism that is cost effective. Further, there is need of a drawout mechanism that is comparatively more efficient. Moreover, there is need of a drawout mechanism that is adapted to absorb both vertical and horizontal misalignment. Furthermore, there is need of a drawout mechanism that has modular structure.

OBJECTS

Some of the objects of the system of the present disclosure which at least one embodiment herein satisfies are as follows:

It is an object of the system of the present disclosure to ameliorate one or more problems of the prior art or to at least provide a useful alternative.

An object of the system of the present disclosure is to provide a lead screw operated drawout mechanism that is cost effective.

Another object of the system of the present disclosure is to provide a lead screw operated drawout mechanism that is comparatively more efficient.

Yet another object of the system of the present disclosure is to provide a lead screw operated drawout mechanism that is adapted to absorb both vertical and horizontal misalignment.

Further, an object of the system of the present disclosure is to provide a lead screw operated drawout mechanism that has modular structure.

Furthermore, an object of the system of the present disclosure is to provide a lead screw operated drawout mechanism that is reliable in operation.

Other objects and advantages of the system of the present disclosure will be more apparent from the following description when read in conjunction with the accompanying figures, which are not intended to limit the scope of the present disclosure.

SUMMARY

In accordance with one aspect of the present disclosure, a lead screw operated drawout mechanism for an electrical system is disclosed. The lead screw operated drawout mechanism includes a lead screw, a nut, a drive shaft and a connecting mechanism. The lead screw is supported on a support frame in a way such that the lead screw is adapted to rotate with respect to the support frame. The nut is adapted to be disposed on the lead screw, wherein rotary motion of the lead screw facilitates linear motion of the nut on the lead screw. The drive shaft is rigidly disposed on the nut and adapted to configure linear motion along with the nut. The connecting mechanism is functionally connected to the drive shaft and the electrical system for facilitating activation and de-activation of the electrical system Typically, the lead screw does not configure linear motion with respect to the support frame.

Typically, the lead screw is supported on the support frame by means of at least one bearing.

Further, the nut has threads configured thereon, wherein the threads of the nut are complimentary to threads of the lead screw.

In one embodiment, a handle is connected to the lead screw for facilitating rotational motion to the lead screw.

In one embodiment, the connecting mechanism includes a lever.

Alternatively, in another embodiment, the connecting mechanism includes a lever and a claw, wherein the claw is pivotably connected to the lever.

Typically, the lever is pivotably connected to the drive shaft.

The connecting mechanism in the activation state of the electrical system may facilitate a Connect configuration and a Test configuration of the electrical system.

BRIEF DESCRIPTION OF ACCOMPANYING DRAWINGS

The lead screw operated drawout mechanism of the present disclosure will now be explained in relation to the non-limiting accompanying drawings, in which.

DETAILED DESCRIPTION OF THE ACCOMPANYING DRAWINGS

The lead screw operated drawout mechanism of the present disclosure will now be described with reference to the accompanying drawings which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description hereinafter, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Figure 1:
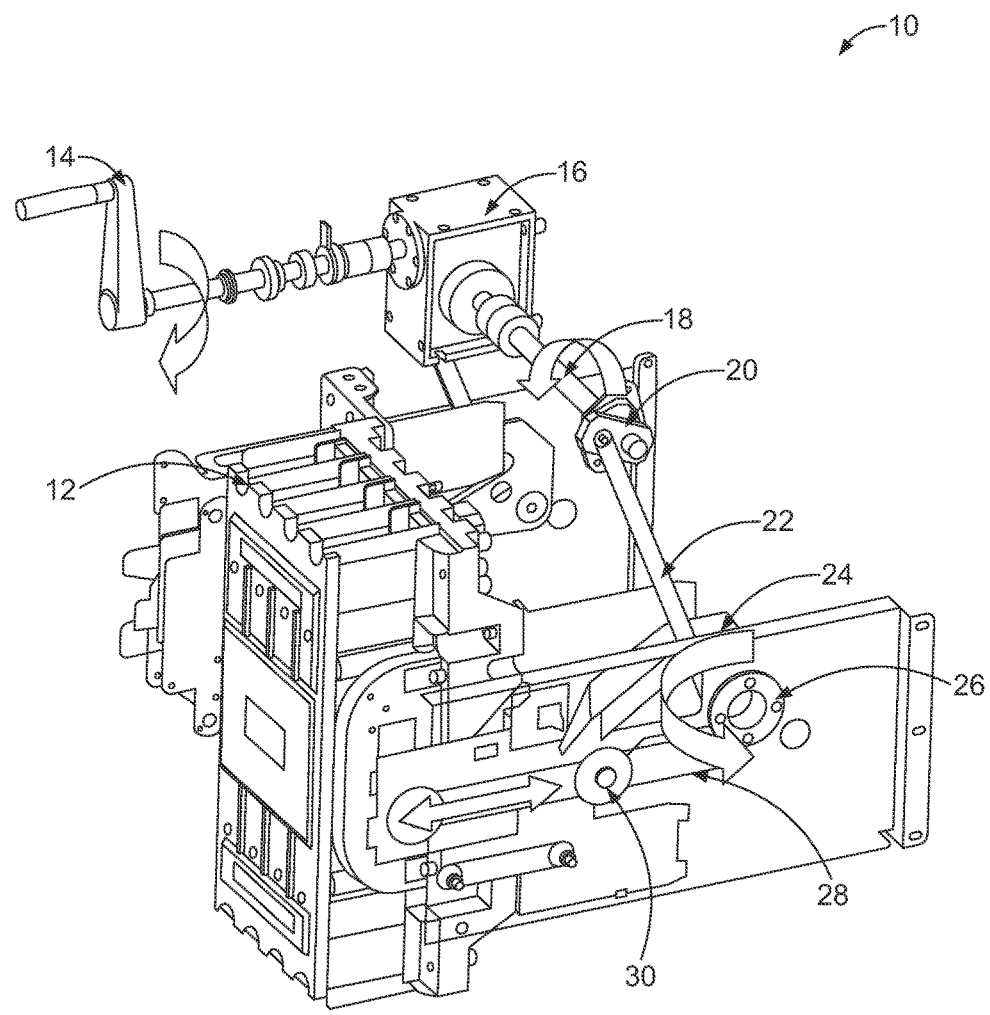
FIG. 1 illustrates a perspective view of a prior art drawout mechanism.

Referring to FIG. 1, a prior art drawout mechanism 10 is disclosed. The prior art drawout mechanism 10 is used for activating and deactivating an Automatic Transfer Switch (ATS) 12. The prior art drawout mechanism 10 includes an input handle 14, a worm gear box 16, a drive shaft 18, a connecting link 20, a lever 22 and a claw 24. The housing of the ATS 12 includes a claw holding piece 26 and a wheel guiding frame 28. The ATS 12 includes wheels 30. The worm gear box 16 converts the rotary motion of the input handle 14 into a linear motion of the ATS 12 through linkages and other mechanisms, such as the drive shaft 18, the connecting link 20, the lever 22, the claw 24, the claw holding piece 26, the wheel guiding frame 28 and the wheel 30.

Although, the prior art drawout mechanism 10 is useful for facilitating various configurations of the ATS 12. However, the prior art drawout mechanism 10 has numerous limitation. For example, the prior art drawout mechanism 10 includes a complicated gear box 16 which is adding more cost and is less efficient. Further, the prior art drawout mechanism 10 is unable to absorb vertical misalignment.

Figure 2:
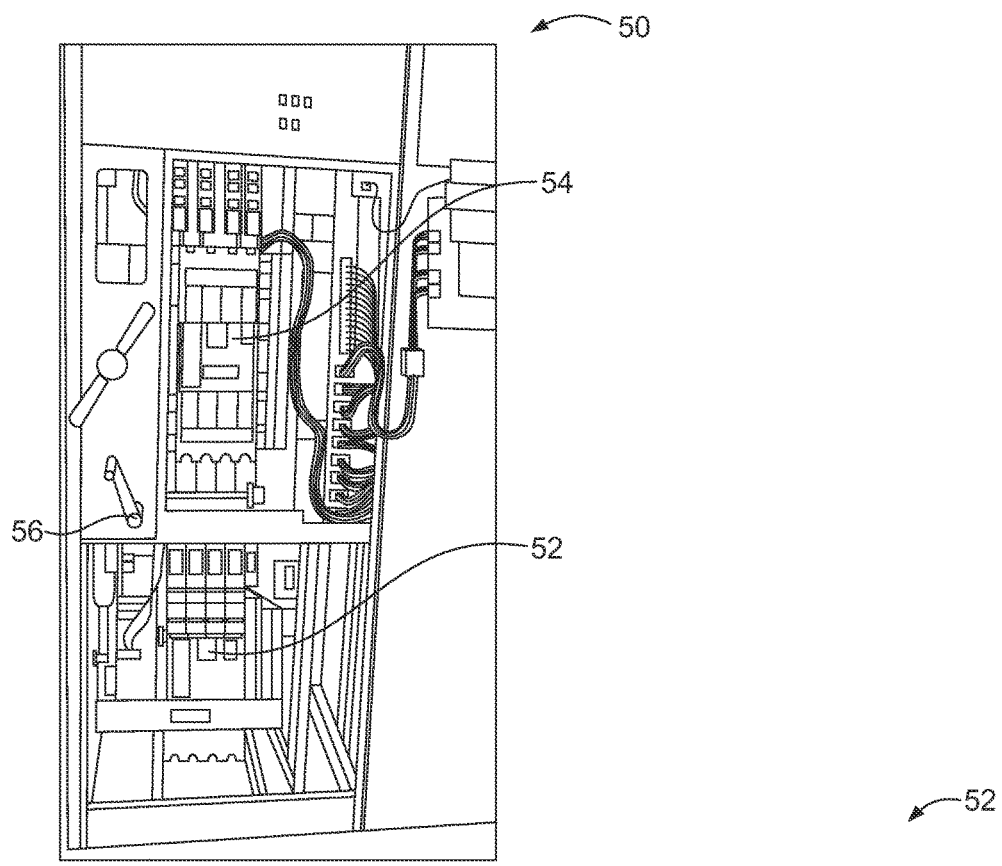
FIG. 2 illustrates a schematic representation of an Automatic Bypass Transfer Switch (ATB) including a pair of Automatic Transfer Switches.
Figure 3:
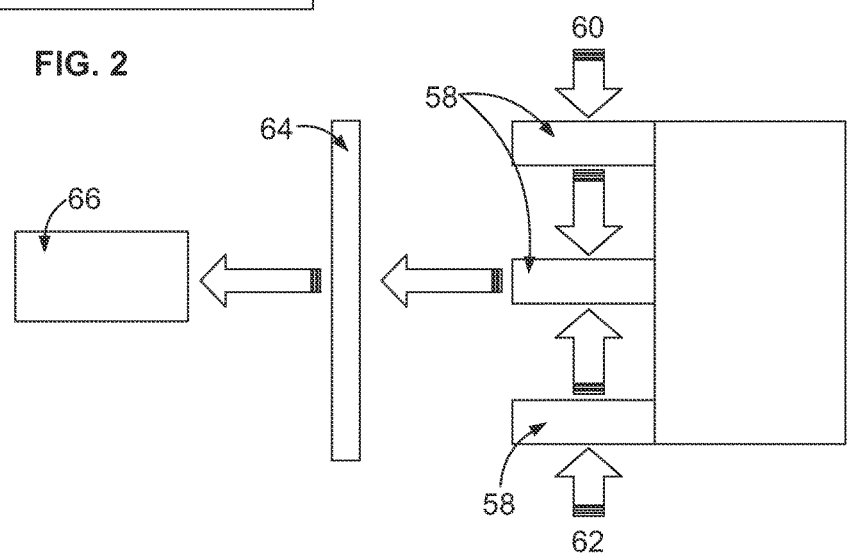
FIG. 3 illustrates a schematic representation of an Automatic Transfer Switch (ATS)

Referring to FIG. 2, an Automatic Bypass Transfer Switch (ATB) 50 includes a pair of Automatic Transfer Switches (ATSs) 52 and 54 and a handle 56. FIG. 3 illustrates schematic representation of the ATS 52. The ATS 52 includes a plurality of isolation connectors 58. The ATS 52 receives normal/utility power supply 60 and an emergency power supply 62. The ATS 52 is adapted to be connected/disconnected to an interface/Bus 64 for supplying continuous supply of power to various devices/end applications 66, such as a motor, an electrical load and associated circuitry and the like. The ATS 52 mainly consists of electrical contacts which are carrying incoming utility and alternate Isolation source. Outgoing connections from the ATS 52 is connected to an end application(s) 66 through the Bus 64.

Normally, the ATS 52 is connected to a utility Isolation source. Whenever there is a fault in the utility supply 60, switching mechanism transfers from the utility Isolation source to the alternate Isolation source. As and when the fault is rectified the switching mechanism again transfers to the utility Isolation source.

Generally, the ATS 52 needs to be maintained periodically or repaired whenever required. If the ATS 52 is mounted stationary to structural members or a frame of the Panel, inspection and maintenance of the ATS 52 becomes difficult and quite hazardous if attempted while the Panel is live.

Figure 4A:
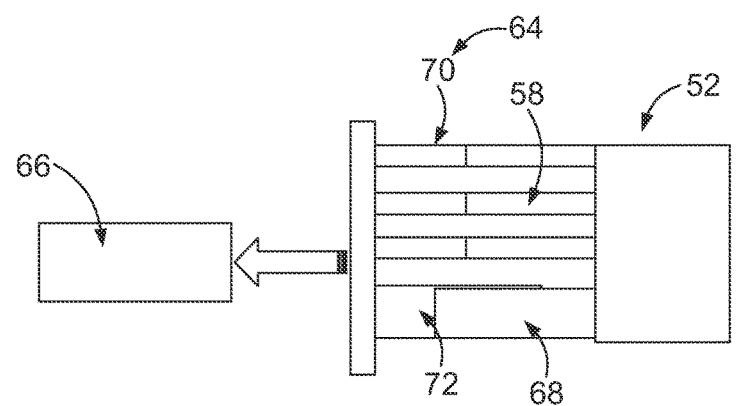
FIG. 4a illustrates a schematic representation of the Automatic Transfer Switch (ATS) of FIG. 3 in a Connect configuration.
Figure 4B:
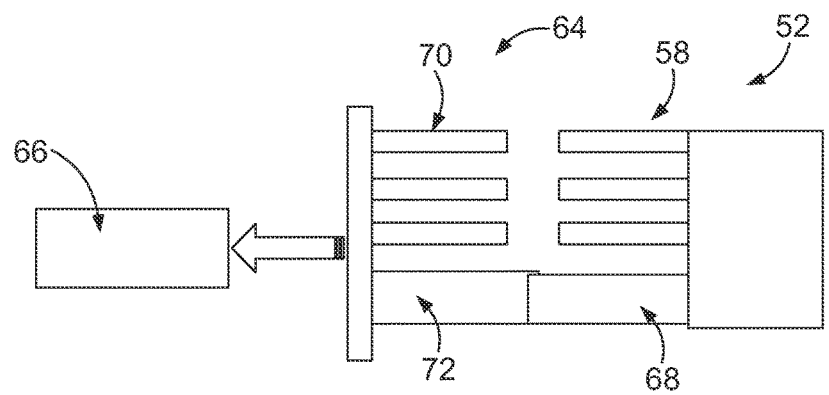
FIG. 4b illustrates a schematic representation of the Automatic Transfer Switch (ATS) of FIG. 3 in a Test configuration.
Figure 4C:
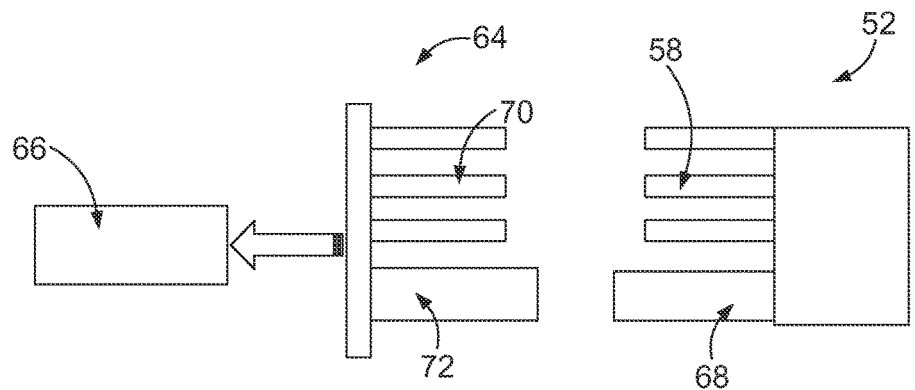
FIG. 4c illustrates a schematic representation of the Automatic Transfer Switch (ATS) of FIG. 3 in an Isolated configuration.

Referring to FIGS. 4a to 4c, various configurations of the ATS 52 is illustrated. The ATS 52 includes isolation connectors 58 and an auxiliary connector 68. The bus/panel/interface 64 includes isolation bus terminals 70 and an auxiliary bus terminal 72. The isolation connectors 58 and the auxiliary connector 68 get plugged respectively on to isolation bus terminals 70 and auxiliary bus terminal 72 of the bus/panel/interface 64. The ATS 52 needs a drawout Mechanism for facilitating movement of the ATS 52 with respect to the bus 64 for facilitating various configurations such as "CONNECT", "TEST" and 'ISOLATED'. The Isolation connectors 58 carry and distribute the electrical Isolation and the Auxiliary Connector 68 provides certain signals or/and annunciation signal for the end application 66.

By standard requirements, a drawout mechanism needs to suffice three configurations "CONNECT", "TEST" and 'ISOLATED'. Referring to FIG. 4a, in 'CONNECT' configuration, both Isolation as well Auxiliary Connector circuits remain closed. In this configuration, the Isolation distribution actually happens and control signals are provided to the end application devices.

Referring to FIG. 4b, in "TEST" configuration, only Auxiliary Connector Circuit is closed and Isolation circuit remains open. In this configuration, Isolation distribution doesn't take place however Auxiliary Connector circuit is closed and signal is drawn/can be drawn to actuate a few end application devices. Also, the devices connected in Auxiliary Connector circuit are not protected against electrical faults. It is a common practice to provide a "TEST" position for a Motor control unit to intermediate its engaged and disengaged positions where the Isolation Connectors 58, 70 are separated but the Auxiliary Connectors 68, 72 are still engaged. In this "TEST" configuration, the accessorial functions can be thoroughly tested in safety while the Distribution is dead.

Referring to FIG. 4c, in 'ISOLATED' configuration, both Isolation and Auxiliary Connectors contacts are open. In this configuration, all the electrical connections, Isolation and Auxiliary Connectors are disconnected. Opening and closing of Isolation and Auxiliary Connector circuits, in the three states elaborated above, are achieved by physically engaging and disengaging Isolation Connectors and Auxiliary Connectors. The ATS 52 is provided with a set of Isolation and Auxiliary Connector contacts that are mounted on the ATS 52. Hence in order to engage the connector either the ATS 52 of the adaptable link needs to be physically pushed or are done by draw in with the aid of a drawout mechanism.

Figure 5:
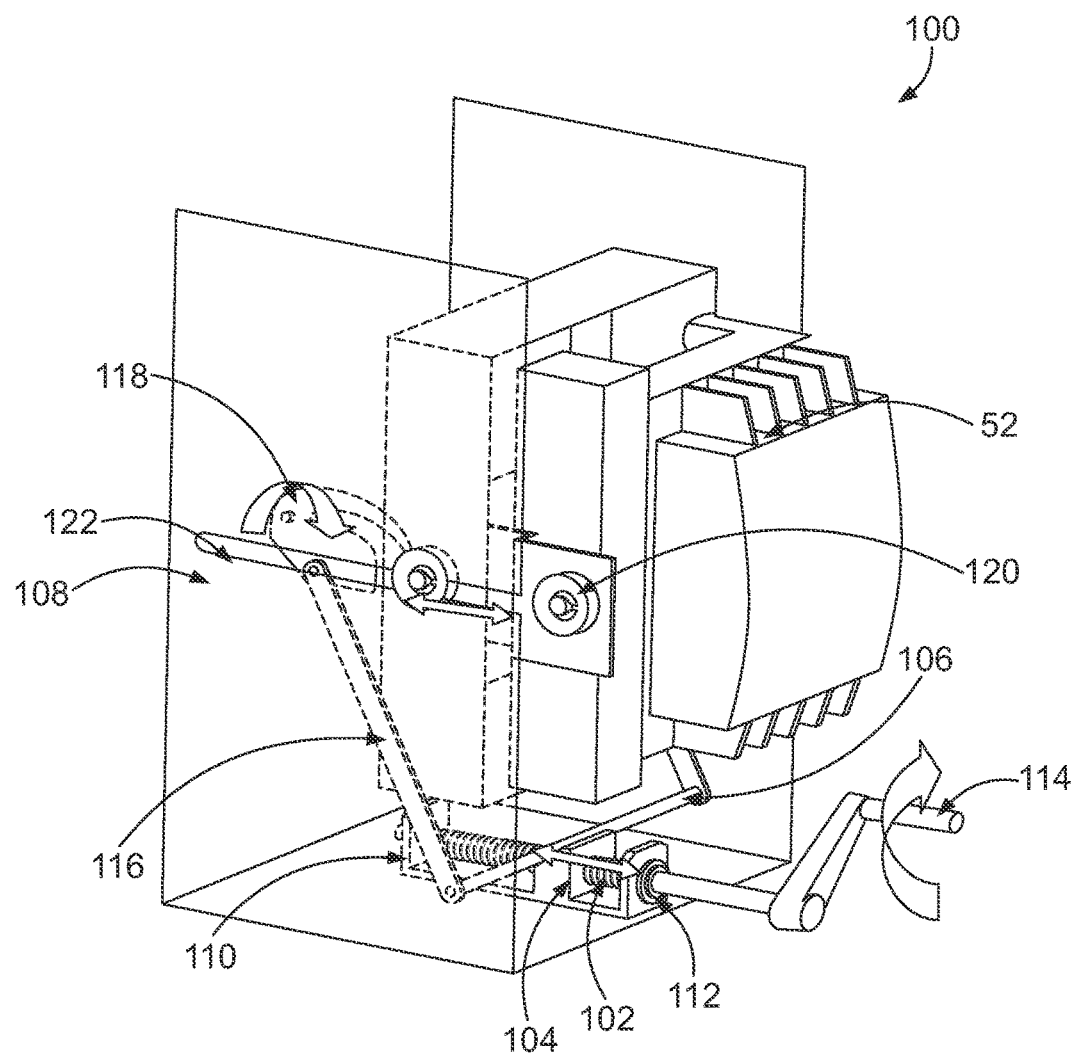
FIG. 5 illustrates a perspective view of a lead screw operated drawout mechanism, in accordance with one embodiment of the present disclosure.
Figure 6:
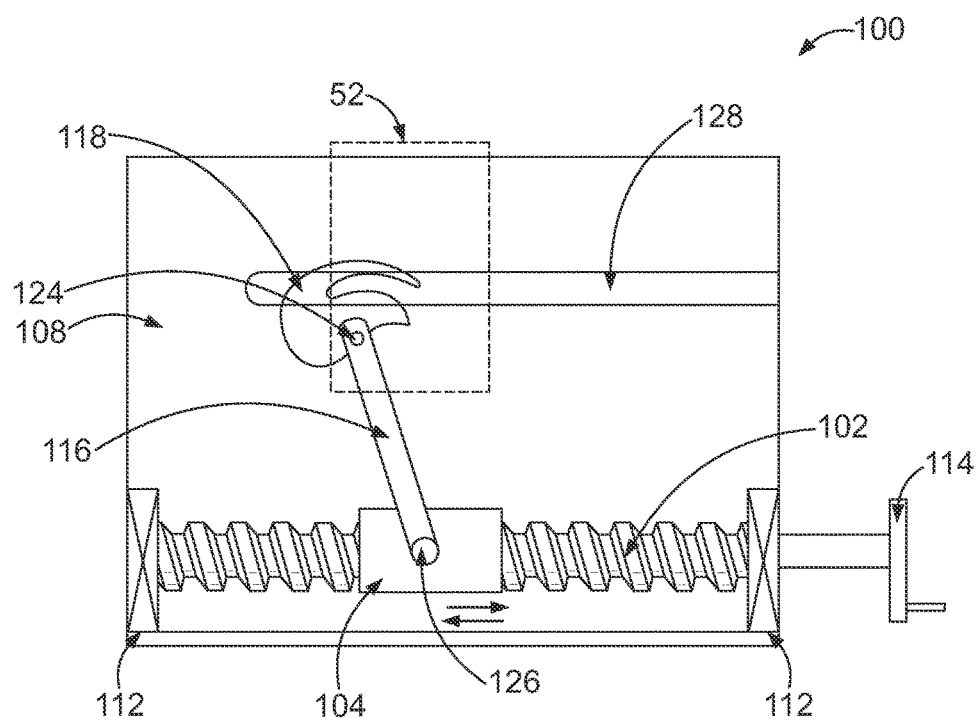
FIG. 6 illustrates a schematic representation of the lead screw operated drawout mechanism of FIG. 5.
Figure 7:
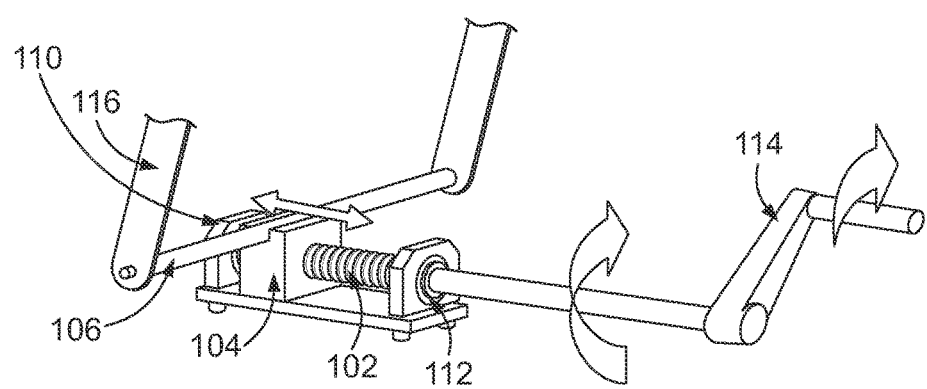
FIG. 7 illustrates a perspective view depicting connection of a drive shaft to a nut of the lead screw operated drawout mechanism of FIG. 5.

Referring to FIGS. 5 to 7, a lead screw operated drawout mechanism 100 is illustrated, in accordance with one embodiment of the present disclosure. The lead screw operated drawout mechanism 100 includes a lead screw 102, a nut 104, a drive shaft 106 and a connecting mechanism 108.

The lead screw 102 is supported at both ends thereof on a support frame 110 in a way such that the lead screw 102 is adapted to rotate with respect to the support frame 110. The lead screw 102 is supported on the support frame 110 by means of bearings 112. In one embodiment, the bearings 112 are provided in the support frame 110 by means of press fitting. However, the present invention is not limited to any particular method used for providing the bearings 112 in the support frame 110. In one embodiment, the lead screw 102 does not configure linear motion with respect to the support frame 110.

The nut 104 is adapted to be disposed on the lead screw 102. In one embodiment, the nut 104 has threads configured thereon, wherein the threads of the nut 104 are complimentary to threads of the lead screw 102. The rotary motion of the lead screw 102 facilitates linear motion of the nut 104 on the lead screw 102. In one embodiment, a handle 114 is connected to the lead screw 102 for facilitating rotational motion to the lead screw 102.

The drive shaft 106 is rigidly disposed on the nut 104 and adapted to configure linear motion along with the nut 104. The connecting mechanism 108 is functionally connected to the drive shaft 106 and the ATS 52 for facilitating activation and de-activation of the ATS 52. The activation state of the ATS 52 is defined by "CONNECT" and "TEST" configurations of the ATS 52 and the de-activation state of the ATS 52 is defined by the 'ISOLATED' configuration. In the present embodiment, the connecting mechanism 108 includes a lever 116 and a claw 118. The claw 118 is pivotably connected to the lever 116 by means of a hinge 124 (illustrated in FIG. 6). Similarly, the lever 116 is pivotably connected to the drive shaft 106 by means of a hinge 126 (illustrated in FIG. 6).

When the input torque is applied to the handle 114, the nut 104 on the lead screw 102 moves linearly. The drive shaft 106 transmits this motion to the ATS 52 through the lever 116 and the claw 118. The claw 118 rotates about the hinge 124 engaging with a bearing attached to one of the pair of the wheels 120 provided on the ATS 52. In one embodiment, the ATS 52 is having four wheels, two at each side. Bearing is provided on the wheels 120 which get in contact with the claw 118. The wheels 120 rotate and linearly moves in a slot 128 (illustrated in FIG. 6) provided in a wheel guiding frame 122. The ATS 52 changes its position as the mechanism 100 moves. Thus making the ATS 52 to move through the steps as isolate, test, connect and the like.

Figure 8:
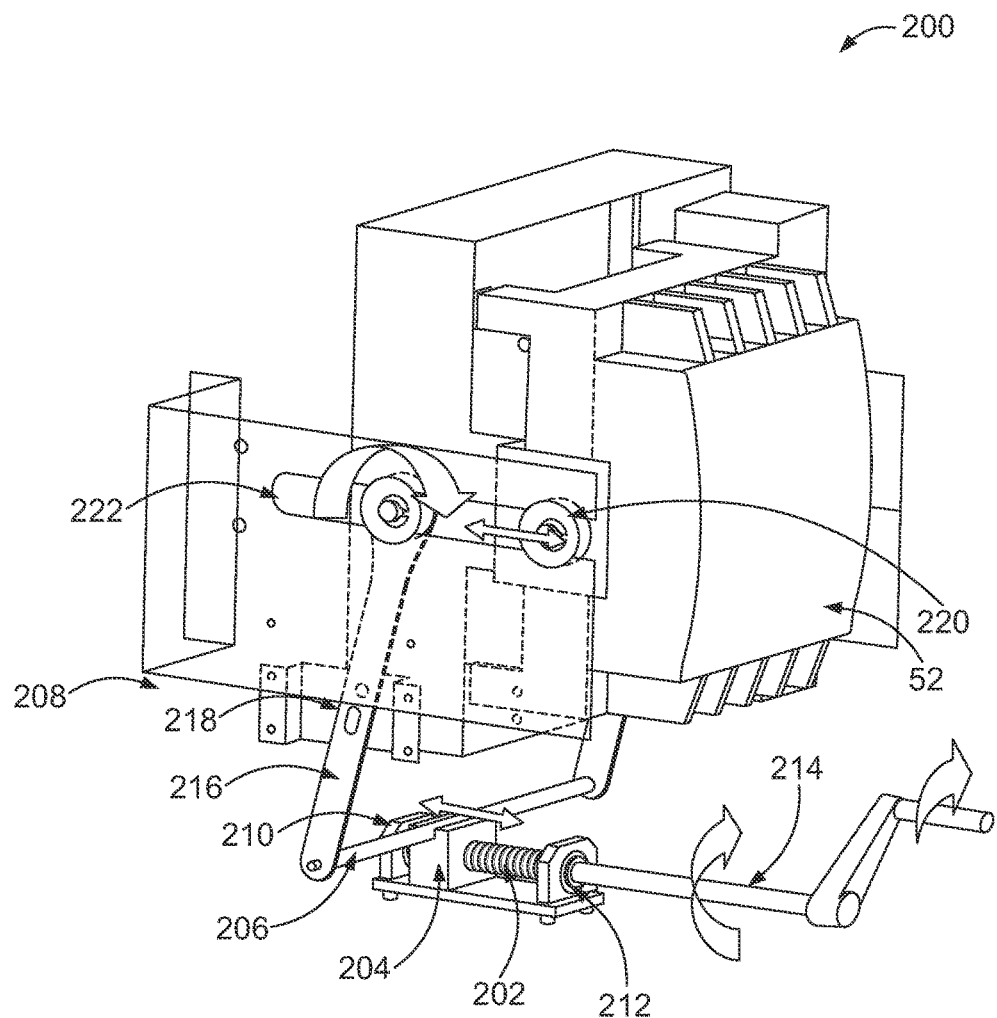
FIG. 8 illustrates a perspective view of a lead screw operated drawout mechanism, in accordance with another embodiment of the present disclosure.
Figure 9:
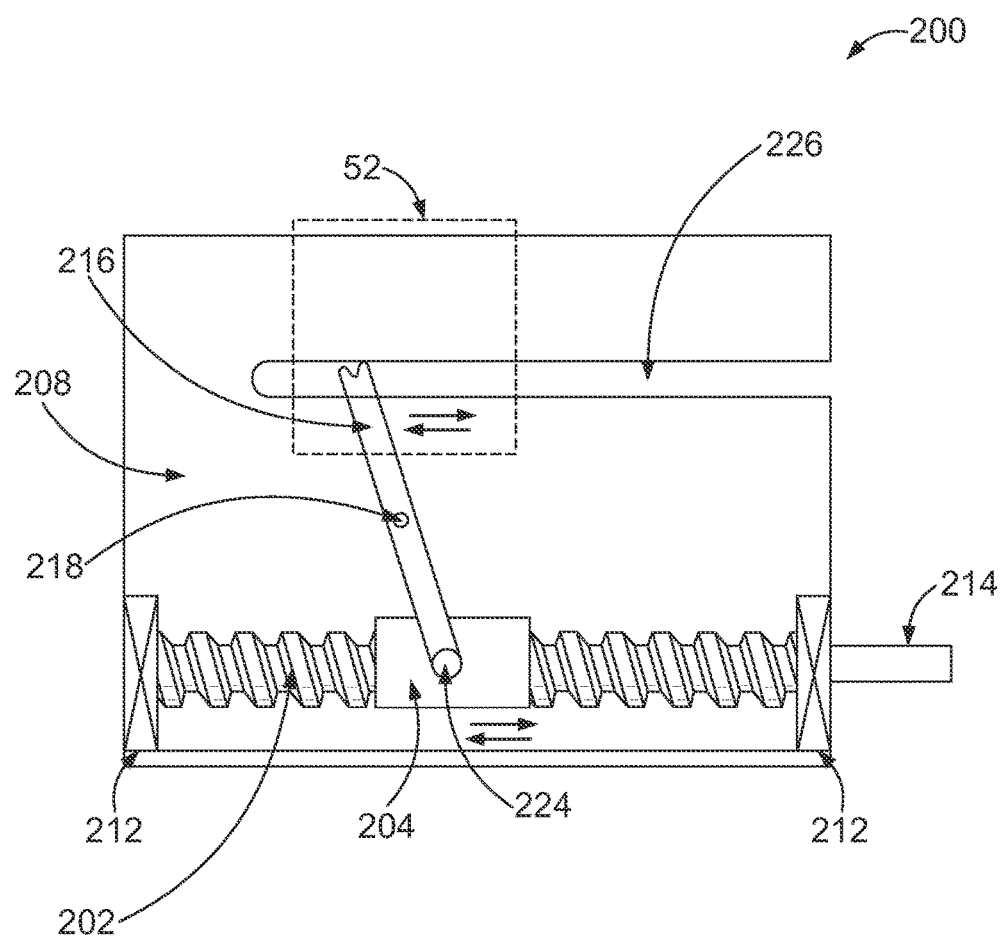
FIG. 9 illustrates a schematic representation of the lead screw operated drawout mechanism of FIG. 8.

Referring to FIGS. 8 and 9, a lead screw operated drawout mechanism 200 is illustrated, in accordance with another embodiment of the present disclosure. The lead screw operated drawout mechanism 200 includes a lead screw 202, a nut 204, a drive shaft 206 and a connecting mechanism 208.

The lead screw 202 is supported at both ends thereof on a support frame 210 in a way such that the lead screw 202 is adapted to rotate with respect to the support frame 210. The lead screw 202 is supported on the support frame 210 by means of bearings 212. In one embodiment, the bearings 212 are provided in the support frame 210 by means of press fitting. However, the present invention is not limited to any particular method used for providing the bearings 212 in the support frame 210. In one embodiment, the lead screw 202 does not configure linear motion with respect to the support frame 210.

The nut 204 is adapted to be disposed on the lead screw 202. In one embodiment, the nut 204 has threads configured thereon, wherein the threads of the nut 204 are complimentary to threads of the lead screw 202. The rotary motion of the lead screw 202 is converted into linear motion of the nut 204 on the lead screw 202. In one embodiment, a handle 214 is connected to the lead screw 202 for facilitating rotational motion to the lead screw 202.

The drive shaft 206 is rigidly disposed on the nut 204 and adapted to configure linear motion along with the nut 204. The connecting mechanism 208 is functionally connected to the drive shaft 206 and the ATS 52 for facilitating activation and de-activation of the ATS 52. The activation state of the ATS 52 is defined by "CONNECT" and "TEST" configurations of the ATS 52 and the de-activation state of the ATS 52 is defined by the 'ISOLATED' configuration. In the present embodiment, the connecting mechanism 208 includes a lever 216 that is pivoted substantially at its mid portion by means of a pivot 218 for facilitating movement of the ATS 52. Further, the lever 216 is pivotably connected to the drive shaft 206 by means of a hinge 224 (illustrated in FIG. 9).

When the input torque is applied to the handle 214, the nut 204 on the lead screw 202 moves linearly. The drive shaft 206 transmits this motion to the ATS 52 through the lever 216. The lever 216 gets engaged with the bearing attached to one of the pair of the wheels 220 provided on the ATS 52. In one embodiment, the ATS 52 is having four wheels, two at each side. Bearing is provided on the wheels 220 which get in contact with the lever 216. The wheels 220 rotate and linearly moves in a slot 226 (illustrated in FIG. 9) provided in the wheel supporting frame 222. The ATS 52 changes its position as the mechanism 200 moves. Thus making the ATS 52 to move through the steps as isolate, test, connect and the like.

The lead screw operated drawout mechanisms 100 and 200 include copper contacts which connects with stationary Bus/Bus at Bus when in "CONNECT" configuration. In "Test" configuration the drawout mechanisms 100 and 200 get disconnected from the Bus/Bus, even in "Isolation" state it remain disconnected. So major function of the drawout mechanisms 100 and 200 is to connect and disconnect with Bus/Bus (finally End application) whenever required. Another function of the drawout mechanisms 100 and 200 is to apply sufficient contact pressure on Bus/Bus when connected in "CONNECT" configuration. This contact pressure is developed by stored energy element. The present disclosure thus provides a mechanism that would have energy stored while the plurality of contacts and Auxiliary Connectors contacts make and this energy is discharged due to which the disengagement of the contacts are almost instantaneous and serves a boom in situations of emergency. Also, the drawout mechanisms 100 and 200 of the present disclosure facilitate self alignment of all poles.

Technical Advancements and Economical Significance

The technical advancements offered by the system of the present disclosure which add to the economic significance of the disclosure include the realization of:

- a lead screw operated drawout mechanism that has modular structure and can be customized to any rating and size of electrical devices;
- a lead screw operated drawout mechanism that is comparatively more reliable due to minimum number of components and no springs;
- a lead screw operated drawout mechanism that is cost effective because of minimum number of components leads to reducing the overall material, process, assembly and elimination of use of gear box;
- a lead screw operated drawout mechanism that is easy to assemble because of minimum number of components; and
- a lead screw operated drawout mechanism that can be mounted on any part of a switch assembly-lead screw operated drawout mechanism of the present disclosure may be mounted at the center, at the left hand side, at the right hand side, at the top of an enclosure containing an Automatic Transfer Switch (ATS). This helps in constructing simple interlock mechanism for an Automatic Transfer Switch (ATS).

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

We claim:

1. A lead screw operated drawout mechanism for an electrical system, said lead screw operated drawout mechanism comprising:
   a lead screw supported on a support frame in a way such that said lead screw adapted to rotate with respect to said support frame;
   a nut disposed on said lead screw, wherein rotary motion of said lead screw facilitates linear motion of said nut on said lead screw along a longitudinal axis of the lead screw;
   a drive shaft rigidly coupled to said nut, wherein the drive shaft, which extends transverse to the longitudinal axis, is adapted to move linearly along with said nut; and
   at least one lever having a first end pivotably coupled to the drive shaft at a pivot point and a second end coupled to an electrical switch having a plurality of contacts, wherein the at least one lever is configured to rotate at the first end about the pivot point in response to linear motion of the drive shaft along with the nut, wherein the pivot point moves linearly along with the drive shaft as the drive shaft moves linearly in response to the linear motion of the nut, and wherein rotation of the at least one lever causes the electrical switch to move linearly so as to cause the plurality of contacts of the electrical switch to engage with or disengage from a respective plurality of contacts of an electrical bus.

2. The lead screw operating mechanism as claimed in claim 1, wherein said lead screw does not configure linear motion with respect to said support frame.

3. The lead screw operated mechanism as claimed in claim 1, wherein said lead screw is supported on said support frame by at least one bearing.

4. The lead screw operated mechanism as claimed in claim 1, wherein said nut has threads configured thereon, wherein said threads of said nut are complimentary to threads of said lead screw.

5. The lead screw operated mechanism as claimed in claim 1, further comprising a handle connected to said lead screw for facilitating rotational motion to said lead screw.

6. The lead screw operated mechanism as claimed in claim 1, wherein a wheel is coupled to the electrical switch, wherein the wheel is configured to rotate and move linearly in a slot disposed in a guiding frame, and wherein the second end of the at least one lever is connected to the wheel.

7. The lead screw operating mechanism as claimed in claim 6, the at least one lever contacts the wheel by way of a claw pivotably connected to the second end of said lever.

8. The lead screw operating mechanism as claimed in claim 7, wherein the second end of the lever contacts the claw and the claw contacts the wheel.

9. The lead screw operating mechanism as claimed in claim 6, wherein rotation of the at least one lever causes the wheel to rotate and move linearly within the slot causing the electrical switch to move linearly along with the wheel.

10. The lead screw operating mechanism as claimed in claim 9, wherein the second end of the at least one lever contacts a bearing attached to the wheel.

11. The lead screw operating mechanism as claimed in claim 1, wherein the plurality of contacts of the electrical switch engaging with or disengaging from the respective plurality of contacts of the electrical bus facilitates a Connect configuration and a Test configuration of said electrical system.

12. The lead screw operating mechanism as claimed in claim 1, wherein the pivot point is axially aligned with a longitudinal axis of the drive shaft as the drive shaft moves linearly.

13. The lead screw operating mechanism as claimed in claim 1, wherein the at least one lever contacts the drive shaft at the pivot point.

14. The lead screw operating mechanism as claimed in claim 1, wherein an axis of the drive shaft is perpendicular to the longitudinal axis of the lead screw.

15. The lead screw operating mechanism as claimed in claim 1, wherein the lead screw is supported at opposing ends by the support frame.

16. The lead screw operating mechanism as claimed in claim 1, wherein the drive shaft is separate from the nut.

17. The lead screw operating mechanism as claimed in claim 16, wherein the nut includes a notch and the drive shaft is disposed in the notch.

18. The lead screw operating mechanism as claimed in claim 1, wherein the pivot point is aligned with a longitudinal axis of the drive shaft such that the at least one lever rotates about the longitudinal axis of the drive shaft.

19. A lead screw operated drawout mechanism for an electrical system, said lead screw operated drawout mechanism comprising:
   a lead screw supported on a support frame in a way such that said lead screw adapted to rotate with respect to said support frame;
   a nut disposed on said lead screw, wherein rotary motion of said lead screw facilitates linear motion of said nut on said lead screw;
   a drive shaft rigidly coupled to said nut adapted to move linearly along with said nut; and
   at least one lever having a first end pivotably coupled to the drive shaft and a second end coupled to an electrical switch having a plurality of contacts, wherein the at least one lever is configured to rotate at the first end about a pivot point in response to linear motion of the drive shaft along with the nut, wherein the pivot point moves linearly along with the drive shaft as the drive shaft moves linearly in response to the linear motion of the nut, and wherein rotation of the at least one lever causes the electrical switch to move linearly so as to cause the plurality of contacts of the electrical switch to engage with or disengage from a respective plurality of contacts of an electrical bus,
   wherein the at least one lever comprises a first lever coupled to a first end of the drive shaft and a second lever coupled to a second end of the drive shaft.

20. The lead screw operating mechanism as claimed in claim 19, wherein the first lever is coupled to a first wheel via a first claw and the second lever is coupled to a second wheel via a second claw,
   wherein the first wheel and the second wheel are coupled to the electrical switch,
   wherein the first wheel and the second wheel are configured to rotate and move linearly in a first slot and a second slot, respectively, disposed in the guide frame, and
   wherein the first wheel and the second wheel are on opposing sides of the electrical switch.

21. The lead screw operating mechanism as claimed in claim 19, wherein, between the first end and the second end, the drive shaft extends transversely across a longitudinal axis of the lead screw,
   wherein the pivot point comprises a first pivot point and a second pivot point,
   wherein the first lever is coupled to the first end at the first pivot point, the second lever is coupled to the second end at the second pivot point, and the nut is coupled to a portion of the drive shaft between the first pivot point and the second pivot point.

22. An automatic transfer switch comprising:
   an electrical switch having a plurality of contacts, including a first contact configured to receive power from a first power source and a second contact configured to receive power from a second power source, wherein the electrical switch is configured to switch between (i) coupling the first contact to an electrical bus and (ii) coupling the second contact to the electrical bus; and
   a lead screw operated drawout mechanism for drawing out the automatic transfer switch from the electrical bus, the lead screw operated drawout mechanism comprising:
      a lead screw supported on a support frame in a way such that said lead screw adapted to rotate with respect to said support frame;
      a nut disposed on said lead screw, wherein rotary motion of said lead screw facilitates linear motion of said nut on said lead screw;
      a drive shaft rigidly coupled to said nut and adapted to move linearly along with said nut; and
      at least one lever having a first end pivotably coupled to the drive shaft at a pivot point and a second end coupled to the electrical switch,
      wherein the at least one lever is configured to rotate at the first end about a pivot point in response to linear motion of the drive shaft along with the nut,
      wherein the pivot point moves linearly along with the drive shaft as the drive shaft moves linearly in response to the linear motion of the nut, and
      wherein rotation of the at least one lever causes the electrical switch to move linearly so as to cause the plurality of contacts of the electrical switch to engage with or disengage from a respective plurality of contacts of the electrical bus.

23. The automatic transfer switch as claimed in claim 22, wherein the pivot point is aligned with a longitudinal axis of the drive shaft such that the at least one lever rotates about the longitudinal axis of the drive shaft.

* * * * *